United States Patent
Zhu

(10) Patent No.: US 9,940,644 B1
(45) Date of Patent: Apr. 10, 2018

(54) MULTIMEDIA PRODUCT PLACEMENT MARKETPLACE

(71) Applicant: Sprint Communications Company L.P., Overland Park, KS (US)

(72) Inventor: Kevin Zhu, Marietta, GA (US)

(73) Assignee: Sprint Communications Company L.P., Overland Park, KS (US)

( * ) Notice: Subject to any disclaimer, the term of this patent is extended or adjusted under 35 U.S.C. 154(b) by 637 days.

(21) Appl. No.: 14/585,448

(22) Filed: Dec. 30, 2014

Related U.S. Application Data

(62) Division of application No. 12/606,276, filed on Oct. 27, 2009, now Pat. No. 8,990,104.

(51) Int. Cl.
G06Q 30/00 (2012.01)
G06Q 30/02 (2012.01)

(52) U.S. Cl.
CPC .................. *G06Q 30/0267* (2013.01)

(58) Field of Classification Search
None
See application file for complete search history.

(56) References Cited

U.S. PATENT DOCUMENTS

| | | | |
|---|---|---|---|
| 5,038,211 A | 8/1991 | Hallenbeck | |
| 5,264,933 A | 11/1993 | Rosser et al. | |
| 5,721,827 A | 2/1998 | Logan et al. | |
| 5,732,216 A | 3/1998 | Logan et al. | |
| 5,774,170 A | 6/1998 | Hite et al. | |
| 5,892,536 A | 4/1999 | Logan et al. | |
| 5,892,554 A | 4/1999 | DiCicco et al. | |
| 5,926,624 A | 7/1999 | Katz et al. | |
| 6,006,257 A | 12/1999 | Slezak | |
| 6,055,566 A | 4/2000 | Kikinis | |
| 6,169,542 B1 | 1/2001 | Hooks et al. | |

(Continued)

FOREIGN PATENT DOCUMENTS

| | | |
|---|---|---|
| WO | WO0237828 A2 | 5/2002 |
| WO | WO2008112401 A1 | 9/2008 |

OTHER PUBLICATIONS

Delker, Jason R., et al., "Method and System for Selecting Advertisements to Display on a Television," U.S. Appl. No. 12/110,277, filed Apr. 25, 2008.

(Continued)

*Primary Examiner* — Matthew T Sittner

(57) ABSTRACT

A multimedia product placement marketplace is provided. A media player presents primary media content received over a first channel. A media component presents auxiliary media content received over a second channel, and selects a portion of an auxiliary media content related to the primary media content, which may have been presented by the media player during a previous time period. If the selected portion of the auxiliary media content is associated with at least one item of information, the media component receives the information over a second channel, and displays the received information via a user interface on the handset. The received information includes a link to a commerce server that provides a commercially available product and/or a commercially available service related to the selected portion of the auxiliary media content to enable a transaction. The link may be based on a highest value bid within a period of time.

19 Claims, 5 Drawing Sheets

(56) References Cited

U.S. PATENT DOCUMENTS

| | | |
|---|---|---|
| 6,240,555 B1 | 5/2001 | Shoff et al. |
| 6,249,252 B1 | 6/2001 | Dupray |
| 6,282,713 B1 | 8/2001 | Kitsukawa et al. |
| 6,351,736 B1 | 2/2002 | Weisberg et al. |
| 6,405,044 B1 | 6/2002 | Smith et al. |
| 6,449,486 B1 | 9/2002 | Rao |
| 6,463,468 B1 | 10/2002 | Buch et al. |
| 6,505,046 B1 | 1/2003 | Baker |
| 6,553,222 B1 | 4/2003 | Weiss |
| 6,578,070 B1 | 6/2003 | Weaver et al. |
| 6,615,408 B1 | 9/2003 | Kaiser et al. |
| 6,698,020 B1 | 2/2004 | Zigmond et al. |
| 6,715,126 B1* | 3/2004 | Chang ............ H04N 21/234318 375/E7.01 |
| 6,718,551 B1 | 4/2004 | Swix et al. |
| 6,760,582 B2 | 7/2004 | Gaal |
| 6,795,702 B2 | 9/2004 | Sennett |
| 6,801,778 B2 | 10/2004 | Koorapaty et al. |
| 6,816,909 B1* | 11/2004 | Chang .................. H04L 65/604 709/217 |
| 6,961,367 B2 | 11/2005 | Simic et al. |
| 7,006,881 B1 | 2/2006 | Hoffberg et al. |
| 7,047,302 B1* | 5/2006 | Chatani ................... A63F 13/12 705/14.73 |
| 7,051,357 B2 | 5/2006 | Carr |
| 7,057,557 B2 | 6/2006 | Lee |
| 7,092,722 B1 | 8/2006 | Oh et al. |
| 7,134,132 B1 | 11/2006 | Ngo et al. |
| 7,178,158 B2 | 2/2007 | Nishina et al. |
| 7,206,748 B1 | 4/2007 | Gruse et al. |
| 7,236,879 B2 | 6/2007 | Tsunehara et al. |
| 7,242,950 B2 | 7/2007 | Suryanarayana et al. |
| 7,343,317 B2 | 3/2008 | Jokinen et al. |
| 7,376,430 B2 | 5/2008 | Matsuda |
| 7,400,884 B2 | 7/2008 | Fok et al. |
| 7,412,484 B1 | 8/2008 | Kikinis |
| 7,444,659 B2 | 10/2008 | Lemmons |
| 7,483,964 B1 | 1/2009 | Jackson et al. |
| 7,509,178 B2 | 3/2009 | Logan et al. |
| 7,519,273 B2 | 4/2009 | Lowthert et al. |
| 7,568,213 B2 | 7/2009 | Carhart et al. |
| 7,624,337 B2 | 11/2009 | Sull et al. |
| 7,779,438 B2 | 8/2010 | Davies |
| 7,831,243 B2 | 11/2010 | Thomas |
| 7,945,271 B1 | 5/2011 | Barnes et al. |
| 8,010,134 B2 | 8/2011 | Barnes et al. |
| 8,010,418 B1 | 8/2011 | Lee |
| 8,037,496 B1* | 10/2011 | Begeja ................. G11B 27/034 725/136 |
| 8,046,803 B1 | 10/2011 | Lee |
| 8,060,407 B1 | 11/2011 | Delker et al. |
| 8,108,895 B2* | 1/2012 | Anderson .............. G06Q 30/02 705/14.4 |
| 8,166,081 B2* | 4/2012 | Christensen ........... G06Q 30/02 455/3.06 |
| 8,180,371 B1 | 5/2012 | Izdepski et al. |
| 8,204,073 B1 | 6/2012 | Gailloux et al. |
| 8,369,871 B1 | 2/2013 | Izdepski et al. |
| 8,462,677 B1 | 6/2013 | Gailloux et al. |
| 8,595,070 B1 | 11/2013 | Barnes et al. |
| 8,606,637 B1 | 12/2013 | Delker et al. |
| 8,806,530 B1 | 8/2014 | Izdepski et al. |
| 8,990,104 B1* | 3/2015 | Zhu ................... G06Q 30/0275 705/14.4 |
| 2001/0001159 A1 | 5/2001 | Ford |
| 2001/0047298 A1 | 11/2001 | Moore et al. |
| 2001/0047384 A1* | 11/2001 | Croy ....................... G06Q 30/02 709/203 |
| 2002/0007493 A1 | 1/2002 | Butler et al. |
| 2002/0049640 A1* | 4/2002 | Sheriff ................ G06Q 30/0272 705/14.68 |
| 2002/0072926 A1* | 6/2002 | Morita ................. G06F 17/30017 705/1.1 |
| 2002/0075332 A1* | 6/2002 | Geilfuss, Jr. ............ G06Q 30/02 715/859 |
| 2002/0083445 A1 | 6/2002 | Flickinger et al. |
| 2002/0086680 A1 | 7/2002 | Hunzinger |
| 2002/0087402 A1 | 7/2002 | Zustak et al. |
| 2002/0099607 A1* | 7/2002 | Sosa ....................... G06Q 20/04 705/14.12 |
| 2002/0100045 A1 | 7/2002 | Rafey et al. |
| 2002/0120925 A1 | 8/2002 | Logan |
| 2002/0131511 A1 | 9/2002 | Zenoni |
| 2002/0144262 A1 | 10/2002 | Plotnick et al. |
| 2002/0147987 A1 | 10/2002 | Reynolds et al. |
| 2002/0167444 A1 | 11/2002 | Lee |
| 2002/0169540 A1 | 11/2002 | Engstrom |
| 2002/0174425 A1 | 11/2002 | Markel et al. |
| 2003/0001846 A1 | 1/2003 | Davis et al. |
| 2003/0008668 A1 | 1/2003 | Perez-Breva et al. |
| 2003/0011477 A1 | 1/2003 | Clapper |
| 2003/0028873 A1 | 2/2003 | Lemmons |
| 2003/0037335 A1* | 2/2003 | Gatto ....................... H04N 5/76 725/86 |
| 2003/0065805 A1 | 4/2003 | Barnes, Jr. |
| 2003/0070182 A1 | 4/2003 | Pierre et al. |
| 2003/0073411 A1 | 4/2003 | Meade, II |
| 2003/0093790 A1 | 5/2003 | Logan et al. |
| 2003/0093794 A1 | 5/2003 | Thomas et al. |
| 2003/0097301 A1* | 5/2003 | Kageyama ........ G06F 17/30265 705/14.52 |
| 2003/0110130 A1 | 6/2003 | Pelletier |
| 2003/0126597 A1 | 7/2003 | Darby et al. |
| 2003/0135853 A1 | 7/2003 | Goldman et al. |
| 2003/0149975 A1 | 8/2003 | Eldering et al. |
| 2003/0149983 A1 | 8/2003 | Markel |
| 2003/0158780 A1 | 8/2003 | Isobe et al. |
| 2003/0163815 A1 | 8/2003 | Begeja et al. |
| 2003/0226142 A1 | 12/2003 | Rand |
| 2004/0003102 A1 | 1/2004 | DuVall et al. |
| 2004/0006767 A1 | 1/2004 | Robson et al. |
| 2004/0034874 A1 | 2/2004 | Hord et al. |
| 2004/0073915 A1 | 4/2004 | Dureau |
| 2004/0133518 A1* | 7/2004 | Dryall .................... G06Q 30/02 705/50 |
| 2004/0140361 A1 | 7/2004 | Paul et al. |
| 2004/0162090 A1 | 8/2004 | Suryanarayana et al. |
| 2004/0194131 A1 | 9/2004 | Ellis et al. |
| 2004/0198386 A1 | 10/2004 | Dupray |
| 2004/0243519 A1 | 12/2004 | Perttila et al. |
| 2004/0248561 A1* | 12/2004 | Nykanen ................. H04L 47/10 455/414.2 |
| 2004/0252400 A1* | 12/2004 | Blank ................ G06F 17/30017 360/70 |
| 2004/0261100 A1 | 12/2004 | Huber et al. |
| 2005/0009525 A1 | 1/2005 | Evslin |
| 2005/0120391 A1 | 6/2005 | Haynie et al. |
| 2005/0137958 A1 | 6/2005 | Huber et al. |
| 2005/0192024 A1 | 9/2005 | Sheynblat |
| 2005/0267798 A1* | 12/2005 | Panara .................... G06Q 30/02 705/14.61 |
| 2006/0015409 A1 | 1/2006 | Kato et al. |
| 2006/0089153 A1 | 4/2006 | Sheynblat |
| 2006/0092966 A1 | 5/2006 | Sitnik et al. |
| 2006/0100963 A1* | 5/2006 | Leurs ...................... H04N 7/163 705/51 |
| 2006/0126556 A1 | 6/2006 | Jiang et al. |
| 2006/0129688 A1* | 6/2006 | Chatani ................... A63F 13/12 709/229 |
| 2006/0136399 A1* | 6/2006 | Conwell ........... G06F 17/30749 |
| 2006/0168630 A1 | 7/2006 | Davies |
| 2006/0173744 A1* | 8/2006 | Kandasamy ........... G06Q 30/02 705/14.42 |
| 2006/0178932 A1 | 8/2006 | Lang |
| 2006/0218577 A1 | 9/2006 | Goodman et al. |
| 2006/0253330 A1* | 11/2006 | Maggio .................. G06Q 30/02 705/14.2 |
| 2006/0259930 A1 | 11/2006 | Rothschild |
| 2006/0265657 A1 | 11/2006 | Gilley |
| 2006/0287916 A1* | 12/2006 | Starr ....................... G06Q 30/02 705/14.46 |

(56) References Cited

U.S. PATENT DOCUMENTS

| | | | |
|---|---|---|---|
| 2007/0022032 A1* | 1/2007 | Anderson | G06Q 30/02 705/35 |
| 2007/0033132 A1* | 2/2007 | Defries | G06Q 40/04 705/37 |
| 2007/0033531 A1* | 2/2007 | Marsh | G06F 17/30864 715/738 |
| 2007/0067267 A1* | 3/2007 | Ives | G06F 17/30864 |
| 2007/0078944 A1* | 4/2007 | Charlebois | H04N 21/235 709/217 |
| 2007/0106555 A1* | 5/2007 | Benson | G06Q 30/02 705/14.71 |
| 2007/0130015 A1* | 6/2007 | Starr | G06Q 30/02 705/14.46 |
| 2007/0135087 A1 | 6/2007 | Villevieille et al. | |
| 2007/0143816 A1* | 6/2007 | Gupta | H04H 60/46 725/135 |
| 2007/0157247 A1 | 7/2007 | Cordray et al. | |
| 2007/0161380 A1 | 7/2007 | Fok et al. | |
| 2007/0186228 A1 | 8/2007 | Ramaswamy et al. | |
| 2007/0204310 A1 | 8/2007 | Hua et al. | |
| 2007/0214476 A1 | 9/2007 | Zalewski et al. | |
| 2007/0226761 A1 | 9/2007 | Zalewski et al. | |
| 2007/0244750 A1* | 10/2007 | Grannan | G06Q 30/02 705/14.64 |
| 2007/0250901 A1 | 10/2007 | McIntire et al. | |
| 2007/0276729 A1* | 11/2007 | Freer | G06Q 30/02 705/14.44 |
| 2007/0282907 A1* | 12/2007 | Chambers | G06F 17/30041 |
| 2007/0294176 A1* | 12/2007 | Radtke | H04N 21/4384 705/52 |
| 2007/0294773 A1 | 12/2007 | Hydrie et al. | |
| 2008/0009268 A1* | 1/2008 | Ramer | G06F 17/30867 455/412.1 |
| 2008/0010114 A1 | 1/2008 | Head | |
| 2008/0015895 A1* | 1/2008 | Charlson | G06F 19/324 705/2 |
| 2008/0040354 A1* | 2/2008 | Ray | G06F 17/30035 |
| 2008/0040768 A1* | 2/2008 | Robotham | H04L 29/06027 725/132 |
| 2008/0046928 A1* | 2/2008 | Poling | G06F 3/0482 725/40 |
| 2008/0092182 A1* | 4/2008 | Conant | H04N 7/17318 725/109 |
| 2008/0103886 A1* | 5/2008 | Li | G06Q 30/02 705/14.71 |
| 2008/0104658 A1* | 5/2008 | Lim | H04N 5/76 725/142 |
| 2008/0109306 A1* | 5/2008 | Maigret | G06F 21/10 705/14.46 |
| 2008/0109843 A1 | 5/2008 | Ullah | |
| 2008/0119206 A1* | 5/2008 | Shalmon | G06Q 30/02 455/456.3 |
| 2008/0124052 A1* | 5/2008 | Sardera | G11B 27/005 386/343 |
| 2008/0134012 A1* | 6/2008 | Kokes | G06F 17/30017 715/201 |
| 2008/0148320 A1 | 6/2008 | Howcroft | |
| 2008/0153413 A1 | 6/2008 | Li et al. | |
| 2008/0168168 A1* | 7/2008 | Hamilton | H04L 41/00 709/224 |
| 2008/0189736 A1 | 8/2008 | Edwards et al. | |
| 2008/0227467 A1* | 9/2008 | Barnes | G06Q 30/0259 455/456.2 |
| 2008/0229353 A1 | 9/2008 | Morris et al. | |
| 2008/0243583 A1* | 10/2008 | Miyaki | G06Q 30/02 705/14.68 |
| 2008/0256572 A1 | 10/2008 | Chen | |
| 2008/0262958 A1* | 10/2008 | Ku | G06Q 30/08 705/37 |
| 2008/0276270 A1 | 11/2008 | Kotaru et al. | |
| 2008/0281878 A1* | 11/2008 | Scott | G06F 17/30194 |
| 2008/0294694 A1* | 11/2008 | Maghfourian | G06F 17/30855 |
| 2008/0301732 A1* | 12/2008 | Archer | H04N 21/252 725/40 |
| 2008/0304805 A1 | 12/2008 | Baharav et al. | |
| 2008/0306871 A1* | 12/2008 | Grannan | G06F 21/10 705/51 |
| 2008/0319828 A1 | 12/2008 | Southam et al. | |
| 2009/0076898 A1* | 3/2009 | Wang | G06Q 30/02 705/14.56 |
| 2009/0083815 A1* | 3/2009 | McMaster | H04N 7/17318 725/110 |
| 2009/0119723 A1* | 5/2009 | Tinsman | H04N 7/165 725/87 |
| 2009/0138330 A1* | 5/2009 | Higgins | G06Q 30/02 705/7.29 |
| 2009/0157450 A1* | 6/2009 | Athsani | G06Q 30/02 705/35 |
| 2009/0164287 A1* | 6/2009 | Kies | G06Q 30/0277 705/1.1 |
| 2009/0171721 A1* | 7/2009 | LeBaron | G06F 17/30864 705/14.54 |
| 2009/0171787 A1 | 7/2009 | Mei et al. | |
| 2009/0204640 A1* | 8/2009 | Christensen | G06Q 30/02 |
| 2009/0210898 A1 | 8/2009 | Childress et al. | |
| 2009/0228922 A1* | 9/2009 | Haj-Khalil | G06F 3/0481 725/38 |
| 2009/0228938 A1* | 9/2009 | White | H04N 7/17318 725/87 |
| 2009/0248672 A1* | 10/2009 | McIntire | G06Q 30/02 |
| 2009/0254409 A1* | 10/2009 | Kozhukh | G06Q 10/00 705/7.35 |
| 2009/0254437 A1* | 10/2009 | Lee | G06Q 30/0273 705/14.69 |
| 2009/0280824 A1 | 11/2009 | Rautiainen | |
| 2009/0292979 A1 | 11/2009 | Eisener et al. | |
| 2009/0328095 A1 | 12/2009 | Vinokurov et al. | |
| 2010/0010887 A1* | 1/2010 | Karlin | G06Q 30/02 705/14.15 |
| 2010/0017814 A1* | 1/2010 | Archer | H04N 5/44543 725/14 |
| 2010/0023372 A1* | 1/2010 | Gonzalez | G06Q 10/0637 705/7.36 |
| 2010/0037266 A1* | 2/2010 | Rahman | H04N 5/44543 725/56 |
| 2010/0064221 A1* | 3/2010 | White | G09G 5/14 715/719 |
| 2010/0070350 A1* | 3/2010 | Paunikar | G06Q 30/02 705/14.1 |
| 2010/0094728 A1* | 4/2010 | Denning | G06Q 30/02 705/26.1 |
| 2010/0095333 A1* | 4/2010 | Kelly | H04N 7/17336 725/100 |
| 2010/0107104 A1* | 4/2010 | Bruce | G06F 17/30147 715/772 |
| 2010/0114652 A1* | 5/2010 | Sherr | G06Q 10/00 705/7.11 |
| 2010/0138884 A1* | 6/2010 | Lau | H04N 21/26606 725/104 |
| 2010/0145796 A1* | 6/2010 | Berry | G06Q 30/0251 705/14.49 |
| 2010/0166389 A1* | 7/2010 | Knee | G11B 27/005 386/241 |
| 2010/0180297 A1* | 7/2010 | Levine | H04N 5/45 725/38 |
| 2010/0198681 A1* | 8/2010 | Ramer | G06F 17/30749 705/14.45 |
| 2010/0205628 A1* | 8/2010 | Davis | H04M 1/72533 725/25 |
| 2010/0211459 A1* | 8/2010 | Seeman | G06F 17/30899 705/14.46 |
| 2010/0246955 A1* | 9/2010 | Wright | G06K 9/00711 382/173 |
| 2010/0299191 A1* | 11/2010 | Fernandez Gutierrez | G06Q 30/02 705/14.5 |
| 2010/0306030 A1* | 12/2010 | Mawani | G06Q 30/02 705/14.41 |

(56) References Cited

U.S. PATENT DOCUMENTS

| | | | | |
|---|---|---|---|---|
| 2011/0082725 | A1* | 4/2011 | Steelberg | G06Q 30/02 705/14.4 |
| 2011/0131496 | A1* | 6/2011 | Abram | G11B 27/034 715/722 |
| 2011/0171982 | A1* | 7/2011 | Wang | H04L 67/16 455/466 |
| 2011/0264498 | A1* | 10/2011 | Grant | G06F 17/30864 705/14.17 |
| 2011/0283329 | A1* | 11/2011 | Davis | H04M 1/72533 725/62 |
| 2011/0288938 | A1* | 11/2011 | Cook | G06Q 30/0251 705/14.66 |

OTHER PUBLICATIONS

Delker, Jason R., et al., "Media Insertion Points," U.S. Appl. No. 12/243,735, filed Oct. 1, 2008.
Izdepski, Erich, et al., "Multimedia Broadcast Discovery and Delivery," filed Sep. 26, 2006, U.S. Appl. No. 11/527,929.
Delker, Jason R., et al., "Video Content Tagging System and Method," filed Oct. 13, 2006, U.S. Appl. No. 11/580,719.
Federal Communications Commission, 47 C.F.R. 73.682(a), Oct. 1, 2003.
Advanced Television Systems Committee, "ATSC Recommended Practice: Program and System Information Protocol Implementation Guidelines for Broadcasters", Doc. A/69, Jun. 25, 2002.
M. Nilsson, "ID3 Tag Version 2.4.0—Native Frames", Nov. 1, 2000, http://www.id3.org/id3v2.4.0-frames.txt.
M. Nilsson, "ID3 Tag Version 2.4.0—Main Structure", Nov. 1, 2000, http://www.id3.org/id3v2.4.0-structure.txt.
Office Action dated Feb. 25, 2009, U.S. Appl. No. 11/617,707, filed Dec. 28, 2006.
Final Office Action dated Aug. 19, 2009, U.S. Appl. No. 11/617,707, filed Dec. 28, 2006.
Office Action dated Nov. 10, 2009, U.S. Appl. No. 11/617,707, filed Dec. 28, 2006.
Final Office Action dated May 26, 2010, U.S. Appl. No. 11/617,707, filed Dec. 28, 2006.
Advisory Action dated Aug. 3, 2010, U.S. Appl. No. 11/617,707, filed Dec. 28, 2006, 3 pages.
Office Action dated Oct. 7, 2010, U.S. Appl. No. 11/617,707, filed Dec. 28, 2006.
Final Office Action dated Apr. 13, 2011, U.S. Appl. No. 11/617,707, filed Dec. 28, 2006.
Notice of Allowance dated Jun. 10, 2011, U.S. Appl. No. 11/617,707, filed Dec. 28, 2006.
Corrected Notice of Allowability dated Aug. 5, 2011, U.S. Appl. No. 11/617,707, filed Dec. 28, 2006.
Office Action dated Aug. 4, 2010, U.S. Appl. No. 11/850,029, filed Sep. 4, 2007, 11 pages.
Restriction Requirement dated Jan. 11, 2011, U.S. Appl. No. 11/850,029, filed Sep. 4, 2007.
Final Office Action dated Apr. 28, 2011, U.S. Appl. No. 11/850,029, filed Sep. 4, 2007.
Notice of Allowance dated Aug. 5, 2011, U.S. Appl. No. 11/850,029, filed Sep. 4, 2007.
Restriction Requirement dated Jan. 18, 2013, U.S. Appl. No. 13/267,550, filed Oct. 6, 2011.
Pre-Interview Communication dated Mar. 14, 2013, U.S. Appl. No. 13/267,550, filed Oct. 6, 2011.
FAIPP Office Action dated May 14, 2013, U.S. Appl. No. 13/267,550, filed Oct. 6, 2011.
Notice of Allowance dated Aug. 2, 2013, U.S. Appl. No. 13/267,550, filed Oct. 6, 2011.
Office Action dated Oct. 22, 2010, U.S. Appl. No. 12/107,762, filed Apr. 22, 2008.
Final Office Action dated Mar. 14, 2011, U.S. Appl. No. 12/107,762, filed Apr. 22, 2008.
Notice of Allowance dated Mar. 24, 2014, U.S. Appl. No. 12/107,762, filed Apr. 22, 2008.
Restriction Requirement dated Mar. 8, 2012, U.S. Appl. No. 12/606,276, filed Oct. 27, 2009.
FAIPP Pre-Interview Communication dated May 14, 2012, U.S. Appl. No. 12/606,276, filed Oct. 27, 2009.
First Action Interview Office Action dated Jul. 18, 2012, U.S. Appl. No. 12/606,276, filed Oct. 27, 2009.
Final Office Action dated Sep. 7, 2012, U.S. Appl. No. 12/606,276, filed Oct. 27, 2009.
Advisory Action dated Oct. 31, 2012, U.S. Appl. No. 12/606,276, filed Oct. 27, 2009.
Office Action dated May 5, 2014, U.S. Appl. No. 12/606,276, filed Oct. 27, 2009.
Notice of Allowance dated Sep. 17, 2014, U.S. Appl. No. 12/606,276, filed Oct. 27, 2009.
Office Action dated Sep. 28, 2010, U.S. Appl. No. 12/110,277, filed Apr. 25, 2008.
Final Office Action dated Apr. 13, 2011, U.S. Appl. No. 12/110,277, filed Apr. 25, 2008.
Advisory Action dated Jun. 8, 2011, U.S. Appl. No. 12/110,277, filed Apr. 25, 2008.
Office Action dated Sep. 19, 2011, U.S. Appl. No. 12/110,277, filed Apr. 25, 2008.
Final Office Action dated Apr. 3, 2012, U.S. Appl. No. 12/110,277, filed Apr. 25, 2008.
Advisory Action dated Jun. 15, 2012, U.S. Appl. No. 12/110,277, filed Apr. 25, 2008.
Office Action dated Dec. 27, 2010, U.S. Appl. No. 12/243,735, filed Oct. 1, 2008.
Final Office Action dated May 16, 2011, U.S. Appl. No. 12/243,735, filed Oct. 1, 2008.
Advisory Action dated Jul. 22, 2011, U.S. Appl. No. 12/243,735, filed Oct. 1, 2008.
Office Action dated Aug. 15, 2011, U.S. Appl. No. 12/243,735, filed Oct. 1, 2008.
Final Office Action dated Dec. 6, 2011, U.S. Appl. No. 12/243,735, filed Oct. 1, 2008.
Advisory Action dated Feb. 14, 2012, U.S. Appl. No. 12/243,735, filed Oct. 1, 2008.
Office Action dated Feb. 20, 2009, U.S. Appl. No. 11/466,643, 25 pages.
Final Office Action dated Sep. 1, 2009, U.S. Appl. No. 11/466,643, 33 pages.
Advisory Action dated Dec. 1, 2009, U.S. Appl. No. 11/466,643, 2 pages.
Office Action dated Sep. 9, 2016, U.S. Appl. No. 14/077,207, filed Nov. 11, 2013.
Office Action dated Mar. 13, 2017, U.S. Appl. No. 14/077,207, filed Nov. 11, 2013.
Final Office Action dated Sep. 1, 2017, U.S. Appl. No. 14/077,207, filed Nov. 11, 2013.
Advisory Action dated Oct. 6, 2017, U.S. Appl. No. 14/077,207, filed Nov. 11, 2013.
Office Action dated Feb. 2, 2010, U.S. Appl. No. 11/466,643, 31 pages.
Office Action dated May 24, 2011, U.S. Appl. No. 11/466,643.
Notice of Allowance dated Feb. 16, 2012, U.S. Appl. No. 11/466,643.
Office Action dated Dec. 29, 2008, U.S. Appl. No. 11/580,719, 29 pages.
Office Action dated Jul. 7, 2009, U.S. Appl. No. 11/580,719, 25 pages.
Office Action dated Apr. 29, 2009, U.S. Appl. No. 11/466,558, 14 pages.
Final Office Action dated Nov. 3, 2009, U.S. Appl. No. 11/466,558, 19 pages.
Office Action dated Mar. 5, 2010, U.S. Appl. No. 11/466,558, 21 pages.
Final Office Action dated Aug. 26, 2011, U.S. Appl. No. 11/466,558, 21 pages.
Office Action dated Aug. 2, 2012, U.S. Appl. No. 11/466,558.

(56) References Cited

OTHER PUBLICATIONS

Notice of Allowance dated Feb. 5, 2013, U.S. Appl. No. 11/466,558.

* cited by examiner

MULTIMEDIA PRODUCT PLACEMENT MARKETPLACE

CROSS-REFERENCE TO RELATED APPLICATIONS

This application is a divisional of and claims priority under 35 U.S.C. § 120 to U.S. patent application Ser. No. 12/606,276, filed on Oct. 27, 2009, entitled, "Multimedia Product Placement Marketplace," which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advertising may be an integral part of multimedia content from radio and television broadcasts to motion pictures. Advertising may be implemented in many forms with multimedia content, including a single sponsor paying for large blocks of advertising time before and after multimedia presentations and multiple sponsors purchasing short advertisement times throughout a multimedia presentation. Another less invasive method of advertising is through product placement. Product placement is the use of real commercial products by characters featured in multimedia content. For example, an actor may prominently use a commercially available cell phone during a television program. The use of product placement in multimedia content is presented in such a way as to evoke a response from a potential customer that may be associated with the product in order to encourage the purchase of the product.

SUMMARY

In some embodiments, a system is provided for a multimedia product placement marketplace. The system includes a processor on a handset, a memory on the handset, and a media component stored in the memory. When executed by the processor, the media component selects a portion of an auxiliary media content related to a primary media content received by a media player over a first channel and determines whether the selected portion of the auxiliary media content is associated with at least one item of information. If the selected portion of the auxiliary media content is associated with the information, the media component receives the information over a second channel and displays the received information via a user interface on the handset. The received information includes a link to a commerce server that provides a commercially available product and/or a commercially available service related to the selected portion of the auxiliary media content to enable a transaction.

In some embodiments, a computer implemented method is provided for a multimedia product placement marketplace. A media player presents primary media content received over a first channel. A media component presents auxiliary media content received over a second channel. The media component selects a portion of the auxiliary media content related to the primary media content presented by the media player during a previous time period and determines whether the selected portion of the auxiliary media content is associated with at least one item of information. If the selected portion of the auxiliary media content is associated with the information, the media component receives the information over the second channel and displays the received information via a user interface on the handset. The received information includes a link to a commerce server that provides a commercially available product and/or a commercially available service related to the selected portion of the auxiliary media content to enable a transaction.

In some embodiments, a system is provided for a multimedia product placement marketplace. The system includes a bid component in a first memory and a media component in a second memory. When executed by a first processor, the bid component receives a bid to associate a content link to an item in a media content and associates the item with the link if the bid is a highest value within a period of time. When executed by a second processor, the media component selects a portion of an auxiliary media content related to a primary media content received by a media player over a first channel, receives the content link over a second channel if the selected portion of the auxiliary media content includes the item, and displays the received content link via a user interface on the handset. The received content link includes a link to a commerce server that provides a commercially available product and/or a commercially available service related to the selected portion of the auxiliary media content to enable a transaction.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
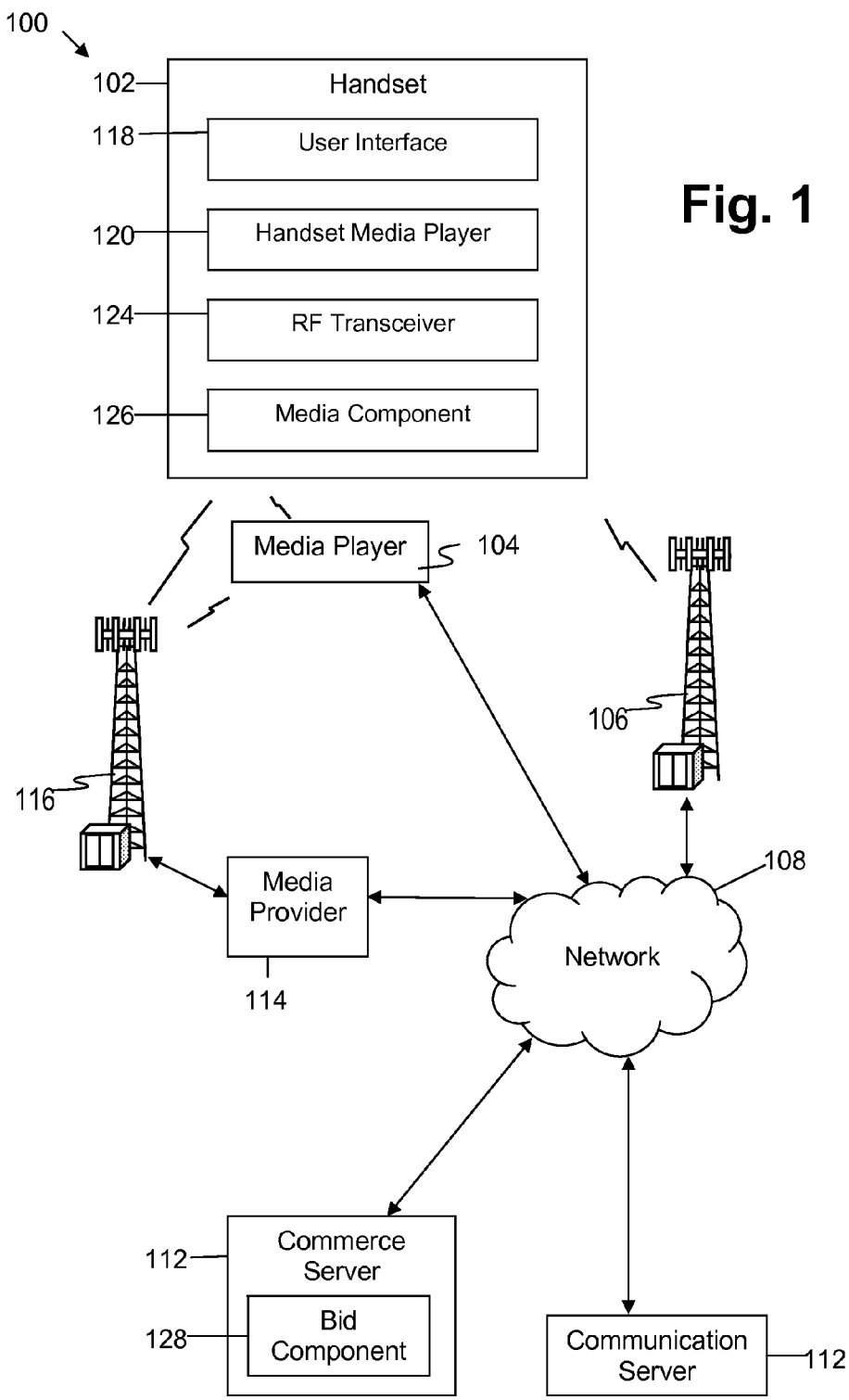
FIG. 1 is a block diagram of a system for a multimedia product placement marketplace according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Advertisements are typically static presentations of commercials or product placements with little or no way for a potential customer to interact with a product or service and act on the emotional or other appeal associated with the presentation of the product or service. Potential customers may be more receptive to multimedia content based on commercially available products or services of interest to the customer when information related to the products or services is delivered at the customer's convenience and does not interfere with the primary programming. A metatag may be inserted into multimedia content to provide options when the customer responds to obtain more information about a product or service in the multimedia content. The insertion of a metatag may be used as a substitute for or an addition to commercials or other advertisements in the multimedia content.

Systems and methods of the pending disclosure provide a multimedia product placement marketplace. A media player presents primary media content received over a first channel, and a media component presents related auxiliary media content received over a second channel. In some contexts the media component may be referred to as a commerce component, because in some embodiments this component may promote ease of marketing and sales completion in association with presentation of media content. In other embodiments, however, the role of the media component may not be limited to promoting commerce, and hence the broader term "media component" may be more commonly used herein. For example, a television plays an action movie received over a cable transmission while a mobile phone either simultaneously or subsequently plays the same action movie received over a mobile phone broadcast. The mobile phone may track the playing of the primary media content and may present an input for selecting a portion of the auxiliary media content related to the primary media content, which may have been presented by the media player during a previous time period. For example, a potential customer uses the mobile phone to select an image of a car driven by a popular actor during a car chase scene in the action movie, either while the television is playing the car chase scene or after the television played the car chase scene. The media component determines whether the selected portion of the auxiliary media content is associated with information. For example, the mobile phone determines whether the image of the selected car is associated with a metatag. If the selected portion of the auxiliary media content is associated with information, the media component receives the information over a second channel, and displays the received information via a user interface on the handset. For example, if the image of the car is associated with a metatag, the mobile phone displays information provided by the metatag on the mobile phone's user interface. The received information includes a hyperlink to a commerce server that provides a commercially available product and/or a commercially available service related to the selected portion of the auxiliary media content to enable a transaction. For example, the user interface displays a hyperlink to a web page for a local car dealer that enables the customer to make an appointment to test drive the model of the car featured in the car chase scene.

The hyperlink may be based on a highest value bid within a period of time. A bid component may receive a bid for an item in media content to be associated with a hyperlink from a bidder, determine whether the bid is a highest value within a period of time, and associate the item with the hyperlink in response to a determination that the bid is a highest value within the period of time. For example, the bid component receives bids from multiple local car dealers that sell the model of the car featured in the car chase scene, determines which local car dealer submitted the highest bid for the current week, and associates the winning dealer's hyperlink with the car in the car chase scene. Rather than responding to the selection of the image of the car by displaying hyperlinks for all of the local dealers, the mobile phone displays only the hyperlink for the local dealer that won the bidding process.

Advertisers may request or order placement of metatags associated with their products and services in multimedia content. The metatags may be accessed without interrupting the presentation of the multimedia content to access information about the products and services, for example advertisements about the products and services. In an embodiment, the original producers of the multimedia content may insert, install, and/or associate the metatags with the subject products and/or services in the multimedia content, for example a metatag associated with a sports car in an action movie. Potential customers may receive transaction information for customer-selected products and services associated with presented multimedia content without interfering with the presentation of the multimedia content, such as allowing other family members to continue watching the action movie unobstructed on the television. Commercial entities may outbid competitors to have their own hyperlink associated with products and services placed in multimedia content. Therefore, embodiments of the present disclosure provide benefits to advertisers, potential customers who are presented with multimedia content, and providers of commercial products and services.

FIG. 1 shows a block diagram of a system 100 for a multimedia product placement marketplace according to some embodiments of the present disclosure. The system 100 includes a handset 102, a media player 104, a base transceiver station (BTS) 106, a network 108, a communication server 110, a commerce server 112, a media provider 114 and a broadcast tower 116.

The handset 102 may be a mobile phone, a wireless communication device, a pager, a personal digital assistant, a portable computer, a tablet computer, a laptop computer, a digital camera, a digital music player, a digital calculator, an electronic key fob for keyless entry, a second media player, or an inventory control device.

The media player 104 may be a television, a set top box, a gaming console, a satellite radio device, a motion picture theater, a desktop computer, a personal computer, a laptop computer, a tablet computer, a portable telecommunications device, a cellular telephone, a digital telephone, and/or a personal digital assistant (PDA). The media player 104 may receive and display media content from the media provider 114 via a fixed link, such as coaxial cable or optical fiber, or a long range wireless link, such as a satellite link or a worldwide interoperability for microwave access (WiMAX) link. The media provider 114 may also transmit the media content over a broadcast television link to the media player 104. If the media player 104 is a radio, metatags may be sent to the handset 102 that is in communication with the radio 104 and configured to receive and utilize the metatags included in a radio broadcast. In some examples, the handset 102 may be referred to as the mobile phone 102 and the media player 104 may be referred to as the television 104.

The handset 102 may communicate with the servers 110-112 via the base transceiver station 106 and the network 108. The media provider 114 and the broadcast tower 116 may be an advanced television systems committee (ATSC) server 114 and an ATSC tower 116. The handset 102 and the media player 104 may both receive a media stream from the media server 114 via the broadcast tower 116. The media provider 114 may be any device, component, or source, such as a broadcast transmitter, a cable head-end, a telecommunications central office, or any other information distribution hub in a private or public network, such as the Internet, that may transport media content downstream to the media player 104 and/or the handset 102. Media content may include television programs, commercials, movies, streaming video content, streaming audio content, gaming content, still photos, or a combination of these as well as other media content. The media provider 114 may be used by a television cable network, a television broadcast network, a television satellite network, or a video distribution center for cable broadcast in a video over a digital subscriber line (DSL) network, wherein media content may include streamed video over DSL. The media player 104 may provide personal area networks such as radio frequency identification (RFID) or near field communication (NFC) for interacting with metadata information distributed in a radio broadcast using the handset 102 in communication with the radio 104. One skilled in the art will recognize that any other form of multimedia content may be used in accordance with the embodiments described herein.

In some embodiments, the handset 102 may include a user interface 118, a handset media player 120, a radio frequency (RF) transceiver 124, and a media component 126. The handset media player 120 renders and presents audio and video media streams via the user interface 118. The RF transceiver 124 provides frequency shifting, converting received radio frequency signals to baseband and converting baseband transmit signals to radio frequency signals to enable the handset 102 to communicate via a wireless communication technology. The RF transceiver 124 may support some of the interactive aspects of the present disclosure including receiving and decoding media streams. Some of the interaction may take place using the internet protocol (IP). Some of the interactive aspects of the communication described herein may take place via the base transceiver station (BTS) 106 and the network 108. Examples of wireless communication technologies include a code division multiple access (CDMA) technology, an integrated digital enhanced network (IDEN) communication technology, a global system for mobile communication (GSM) technology, a universal mobile telecommunications system (UMTS) technology, a long-term evolution (LTE) technology, a worldwide interoperability for microwave access (WiMAX) technology, and any other air interface protocol technology.

In some embodiments, the commerce server 112 may include a bid component 128. FIG. 1 depicts the system components 102-128 for the purpose of an example, as the system 100 may include any number and type of the system components 102-128. Some details and/or components of the system 100 are not shown or described so as to not crowd FIG. 1 with details.

The media player 104 presents primary media content received over a first channel, and the media component 126 presents related auxiliary media content received over a second channel. For example, the television 104 plays an action movie received over a cable transmission, while the mobile phone 102 simultaneously plays the same action movie received over a mobile phone broadcast. The media player 104 may receive the primary media content from the media provider 114 over the first channel using a long range fixed connection. The media component 126 may receive the related auxiliary media content from the media provider 114 over the second channel using a long range wireless connection. For example, the related auxiliary media may be forwarded from the media provider 114 to the handset 102 over a wireless network by a mobile service provider in communication with the media provider 114 and the handset 102. The handset 102 may communicate with the media player 104 via a short range wireless link, such as a Bluetooth link, a wireless fidelity (WiFi) link, a near field communication (NFC) link, an infrared data association (IrDa) link, a radio frequency identification (RFID) link, a universal serial bus (USB) or other link.

The media component 126 may synchronize presentation of the related auxiliary media content with presentation of the primary media content received by the media player 104. The synchronization may be based on user input entered via the user interface 118. For example, the user of the handset 102 may enter the name and start time of a television broadcast program to enable the synchronization.

The media provider 114 that transmits the primary media content to the media player 104 may also transmit a metatag inserted into the related auxiliary media content to associate a selected portion of the related auxiliary media content with information. A content creator may insert the metatag into the related auxiliary media content before the media provider 114 transmits the related auxiliary media content. A server may insert metatags into the related auxiliary media content in accordance with any standard appropriate for multimedia content, such as the advanced television enhancement forum (ATVEF) standard, the H.264 video codec standard or any other video, image, or audio codec standard. The metatags may be inserted in the auxiliary media content frame by frame during an encoding process. An embedded metatag may include a hyperlink for a URL address for a website which includes information about some commercial product, commercial service, brand name, or program related content. For example, while playing a movie, the television 104 equipped with Bluetooth technology may send the movie with a metatag for a hyperlink over a Bluetooth link to the mobile phone 102. The hyperlink may be to a webpage that includes purchasing information for music related to the movie, or soundtrack, and other purchasing information associated with products or services placed in the movie. The metatag inserted in the related auxiliary media content does not have to be associated with a specific hyperlink at the time of insertion, as the association between inserted metatags and any hyperlinks may be added afterwards, such as after a vendor wins a bidding process to have only the vendor's hyperlink associated with the metatag.

The related auxiliary media content may include an indication of response ranges that indicate a period of time during which a potential customer may have a response to specific portions of the related auxiliary media content. For example, the indication of response ranges may include periods of time that are sentimental during a family scene, suspenseful during a courtroom scene, or action packed during a car chase scene. The periods of time may be indicated in any manner, such as through an indication of a start time and a duration, a start time and an end time, a range of frame numbers, or any other indication of a period of time in the related auxiliary media content that would be recognized by one skilled in the art. The start and end times described above may be time stamps relative to the start of the related auxiliary media content, the end of the related auxiliary media content, or relative to any other intermediate position of the related auxiliary media content, such as relative to a chapter within the related auxiliary media content. While described above as response ranges, the periods of time indicated may include any time in which any commercially available product or service or other item of interest is featured in the auxiliary media content. The other item of interest may include any of an actor, a location, landmarks, or any other item that may be of interest that is featured in the related auxiliary media content. The related auxiliary media content may be substantially similar to the primary media content. Auxiliary media content contains metatags that describe embedded hyperlinks or other pointers to sources of information about products or other items displayed in both the primary and auxiliary media content. The metatags define the hyperlinks that, when chosen by a customer viewing the auxiliary media content on the handset 102, provides the linkage to the commerce server 112 that contains the desired information about the displayed products associated with the hyperlinks.

The response range may also include multiple products and services that are featured during the response range. In the car chase scene example used above, the products may include the car used in the car chase scene, the tires on the car, the apparel worn by the driver of the car, and any other products that may be associated with the emotional appeal provided by the car chase scene. The products and services may be used by the media provider 114 and a user of the handset 102 as described in more detail below.

For broadcast distribution, the same media content is distributed to multiple media players 104 in a particular area or region. For interactive distribution, a customer may initiate distribution upon the media provider 114 receiving requests for specific media content from the media player 104. In this case, the primary media content may be distributed to the requesting media player 104 for immediate play back, distributed and stored on the media player 104 for subsequent play back, or scheduled for distribution at a later time, for example. When the primary media content is stored on the media player 104 for subsequent playback, any metatags associated with the related auxiliary media content may be distributed along with the primary media content and stored on the media player 104 for use when the primary media content is played back. The primary media content alone may be stored on the media player 104, and upon initiating playback or during the playback, the handset 102 may request the related auxiliary media content and current metatags from the media provider 114. The media content may also be distributed on a physical medium such as a digital video disc (DVD), compact disc (CD), or any other physical medium. The metatags may be recorded on the physical medium along with response ranges and the media content. A media provider may dynamically insert the metatags based on their positions previously defined and may dynamically insert the metatags into the auxiliary media content upon request. The metatags may be inserted at any point in the media content, preferably placed in the media content at a point that evokes an emotional or other response. Upon the playback of the related auxiliary media content reaching the point where the metatags have been inserted, selecting a portion of the related auxiliary media content may result in displaying information associated with the metatags if the selected portion of the related auxiliary media content includes a metatag. For example, if the user of the handset 102 selects a portion of the car chase scene that includes the image of the car, and a metatag is inserted in the auxiliary media content for the image of the car, the user interface 118 displays the hyperlink associated with the image of the car by the metatag.

The media provider 114 may send the related auxiliary media content that includes metatags to the handset 102 using a long range wireless connection. For instance, the media player 104 may notify the media provider 114 of the communication with the handset 102. In turn, the media provider 114 may deliver the related auxiliary media content with the metatags directly to the handset 102 over the second channel via the long range wireless connection. Alternatively, the media provider 114 may send the related auxiliary media content that includes metatags using the long range wireless connection to a mobile service provider which may then forward the related auxiliary media content that includes the metatags to the handset 102. For instance, the service provider may send the related auxiliary media content with metatags over a cellular link to a cellular network service provider, which may forward the related auxiliary media content with metatags to the handset 102 over the network. Upon receiving the related auxiliary media content and the metatags, the handset 102 may be used to play the related auxiliary media content. For example, the mobile phone 102 may be used to play the movie that is being played on the television 104 in the room, where the movie received by the handset 102 includes metatags associated with hyperlinks.

Unlike the first communication channel that may be used primarily as a primary media content downstream channel, the second communication channel may be used for providing or down-streaming the related auxiliary media content to the handset 102 and for receiving or up-streaming any customer feedback from the handset 102 to the media player 104 directly or to the media provider 114 that may be communicating with the media player 104. For example, while a potential customer's family enjoys watching the action movie featuring the car chase scene on the television 104, the potential customer selects the image of the car in the car chase scene displayed by the handset 102, without the selection interfering with the family's enjoyment of the movie, for example without pausing or delaying presentation of the content.

A customer action may be any action taken by the customer while the primary media content is being displayed using the media player 104. For example, the customer action may include turning a particular program on, switching to a particular channel, or pausing or replaying a program using a digital video recorder (DVR) system. Monitoring such customer actions, or the customer's pattern of actions, taken while viewing the primary media content may provide a means for the media provider 114 to send the auxiliary media content related to primary media content to the handset 102. Customer feedback may be a selection of a portion of the related auxiliary media content, a selection of a hyperlink, or any communication from the customer that may be related to any media content.

Although one handset 102 is shown in FIG. 1, it should be understood that multiple handsets 102 may be present at the same location and receive the same related auxiliary media content. For example, each member of a family watching the action movie on the television 104 may use their own handset 102 to watch the same movie and select different products and services for potential transactions. When multiple handsets 102 are present within the proximity of a short range wireless link, the media provider 114 and/or commerce server 112 may communicate via separate secondary channels with each handset 102. The media provider 114 may then send to each handset 102 the same related auxiliary media content as described above, each handset 102 may receive the same related auxiliary media content via a long range wireless connection. In an embodiment, the presentation of media on the handset 102 is coordinated with the presentation of media on the television 104 or other media player by the media provider 114, and thus the media provider 114 is able to send the correct auxiliary content to the handset 102.

The hyperlinks may be stored in a memory of the handset 102 until the related auxiliary media content may be accessed at a later time. Information may be requested using the hyperlinks that are stored in the memory of the handset 102.

The media component 126 selects a portion of the auxiliary media content related to the primary media content, which may have been presented by the media player 104 during a previous time period. For example, a potential customer uses the mobile phone 102 to select the image of the car during the car chase scene in the action movie, either while the television 104 is playing the car chase scene or after the television 104 has completed playing the car chase scene. The handset 102 may select a portion of the auxiliary media content by using the navigation or selection capabilities of the user interface 118 to select a digital image in the related auxiliary media content, to capture the digital image, to draw a circle around the digital image, or to use some other types of selection techniques known to those skilled in the art. When a portion of the auxiliary media content is selected via the user interface 118, the media component 126 may identify the selected digital image. For example, if the user interface 118 selects a digital image of the car in the car chase scene near the digital image of one of the car's tires, the media component 126 may send a message via the user interface 118 to inquire whether the user intended to select the car or the car's tires. The media component 126 may seek such a selection clarification even if only one portion of the auxiliary media content is associated with a metatag. For example, even if the car is tagged and the tires are not tagged, the media component 126 may send the selection clarification message just in case the user is interested in the tires and not the car.

The viewer may also select an option to make selections that may access the metatags at a later time. In this case, at a time desired by the viewer, the metatags may be accessed by manipulating the handset 102. Some featured products may include the tires of the car, the car itself, and the paint job on the car. Other products unrelated to a scene in the video playback may also be featured, such as the doors on the building behind the car. A user may navigate between each of the featured products using the handset 102 to select one of the featured products and services.

The media component 126 determines whether the selected portion of the auxiliary media content is associated with information. For example, the mobile phone 102 determines whether the image of the car in the selected portion of the related auxiliary media content is associated with a metatag. The media component 126 may request the information associated with the selected portion of the related auxiliary media content in response to a determination that the selected portion of the related auxiliary media content is not associated with the information, receive the information over a second channel in response to requesting the information, and display the information via the user interface 118. If the potential customer selected a portion of the related auxiliary media content that did not include an item associated with a metatag, the media component 126 may attempt to determine which item is selected from the auxiliary media content. For example, if the user of the handset 102 selects an image of a door in the background of the car chase scene, the media component 126 determines that no metatags are associated with the image of the door, and sends a request for information to the media provider 114. The media provider 114, or some other entity, may periodically examine a list of items that are not associated with metatags but for which information is requested, and may identify at least some of the items and the items' corresponding transaction information. The media provider 114, or some other entity, may subsequently send the transaction information to the requesting media component 126 and/or insert metatags for the identified items in the related auxiliary media content for subsequent presentation. For example, the producers of the action movie identify the door in the background of the car chase scene, identify a hyperlink to a website to purchase the type of door, and provide the hyperlink to the requesting mobile phone 102. The media provider 114 may also accumulate data about non-present requested metatags and do analysis on these requests and use such requests to conduct marketing. The communication server 110 may also collect statistics about the requested metatags from the media component 126 and use these statistics to negotiate bid prices. For example, the bid component 128 on the communication server 110 may use the number of requests for the image in the car as both a statistic to prompt car dealers to bid on associating their hyperlinks with the metatag for the car and as a basis for a minimum bid to have a hyperlink associated with the metatag for the car. A metatag in some cases may be associated with multiple stock-keeping units (SKU) or other designation of the same type of products from the same manufacturer or merchant or different products from different manufacturers or merchants. The commerce server 112 may blend the information associated with a metatag based on the profiles and preferences of subscribers using the handset 102.

The handset 102 may replay the auxiliary media content based on user input entered via the user interface 118, which enables the user to select portions of the auxiliary media content after the related primary media content is no longer presented by the media player 104. For example, after the television 104 finishes playing the car chase scene, the potential customer uses the user interface 118 to rewind and replay the car chase scene on the mobile phone 102

The handset 102 may replay the auxiliary media content based on the auxiliary media content associated with an item identified within the portion of the auxiliary media content. For example, if the user selected a portion of the auxiliary media content that includes the image of the car, the user has the option of requesting the mobile phone 102 to replay every scene that featured the image of the car, which may be enabled by accessing the metatags associated in each scene with the image of the car.

While replaying the auxiliary media content, the handset 102 may present multiple metatags and their corresponding hyperlinks associated with the auxiliary media content. For example, if the user selects the portion of the auxiliary media content that includes the image of the car, the user interface 118 may present the metatags and their corresponding hyperlinks for the car, for the tires on the car, and for the custom paint job on the car. Selection of any of the hyperlinks may enable communication with a commerce server 112 that provides at least one of a commercially available product and a commercially available service related to a selected one of the multiple metatags to enable a transaction. For example, the user of the mobile phone 102 may conduct transactions associated with vendors that provide the car, the tires, or the custom paint job.

Several products and/or services may be featured during a response range with a hyperlink list associated with the corresponding metatags. The hyperlink list may be displayed in response to a user selecting a portion of the auxiliary media content that includes a metatag. The hyperlink list may include a product name and optionally provide a brief description of each product or service in the hyperlink list. It is contemplated that the hyperlink list may be grouped into categories based on the types of products and service featured, such as a category for apparel. From the hyperlink list a user may select one of the products or services featured in the current response range of the media content. In response to the selection of a product or service, the user interface 118 may display the options for further selection by the user. This information may be provided similar to that of a browser where the user may select the content from an active web site. The hyperlink list may be displayed whenever the auxiliary media playback is reversed.

If the selected portion of the auxiliary media content is associated with information, the media component 126 receives the information over a second channel, and displays the received information via the user interface 118. For example, if the image of the car is associated with a metatag, the mobile phone 102 displays information provided by the metatag on the user interface 118. In addition to the hyperlink associated with the metatag, the information may also include additional information that the user may use to determine whether or not to select the hyperlink, such as the description of the item identified in the digital image, the approximate cost of the item, the availability of the item, and further information about the item.

The requested information may be sent from the media provider 114 over a long range wireless connection. The information may be associated with the primary media content being presented at the moment a customer feedback is detected. The requested information may be sent in the form of a text message, for instance in the form of a short message service (SMS) message, and/or a multimedia messaging service (MMS) message.

The received information includes a hyperlink to the commerce server 112 that provides a commercially available product and/or a commercially available service related to the selected portion of the auxiliary media content to enable a transaction. For example, the user interface 118 displays a hyperlink to a web page for a local car dealer that enables the customer to make an appointment to test drive the model of the car featured in the car chase scene.

The options provided by the at least one hyperlink displayed by the user interface 118 may provide the customer multiple choices. One option may be to view a brochure about the car, another option may be to schedule a test drive of the car, and yet another option may be to request quotes from the three dealers nearest to the location of the handset 102. Other options may include a uniform resource locator (URL) hyperlink to a website for the car manufacturer, the phone number of a dealer, or an option to view a commercial about the car, for example. Other transaction options may include purchasing merchandizing related to the car, such as a hat with a decal of the car or car manufacturer logo on it, for example. One skilled in the art will recognize that the options may be readily modified according to the product, service, or other item of interest they are describing. When voice over Internet protocol (VoIP) is employed, the user may select to speak directly with a customer service representative to, for example, schedule the test drive. Where the user selects to commence or complete a transaction, the media component 126 may promote one-click purchasing since much of the necessary information, such as customer name, address, credit card information, may already be available and may be automatically populated.

Metatags may contain links that are routed to different content at different times and in different regions. For example, the link contained in a metatag associated with the image of the car may route to a first web site of a local car dealer during the first six months after the release of a DVD of the action movie and route to a second web site of a different local car dealer during the next six months after the release of the DVD of the action movie. Likewise, the link contained in the metatag associated with the image of the car may route to the first web site of a San Francisco car dealer in a region proximate to San Francisco while the link may route to a third web site of a Boston car dealer in a region proximate to Boston.

The hyperlink displayed by the user interface 118 may be based on a geographic location associated with the handset 102 because a product or service may not be offered in a region corresponding with the location of the handset 102. In this case, some of the options for a transaction with the product or service may not be displayed by the user interface 118. Other options for requesting more information or requesting for the product or service to be offered in the region may still be available. The location of the handset 102 may be determined from a variety of sources. For example, if the media player 104 is a stationary device, such as a television, then the location of the handset 102 may be determined based on a billing address or a home address stored in a customer database. If the media player 104 is a mobile device, then the location of the handset 102 may be determined through executing a location fix technology, such as advanced forward link trilateration, global positioning system, a cell sector location fix technology, and a hybrid location fix technology or any other similar technology to locate on the handset 102. Any other techniques known to those skilled in the art for determining a location of the handset 102 may also be used.

The location information may be used to determine the association of hyperlinks with the metatags inserted into the auxiliary media content and used by the handset 102. For example, a handset 102 at a first location may request a test drive, wherein a test drive request form may be communicated to the closest car dealership from the location of the handset 102 for scheduling a test drive. Another handset 102 at a second location may view and manipulate all of the same information, but have the test drive request form communicated to a different dealership that is closest to the location of the other handset 102. Additionally, the user interface 118 may present multiple hyperlinks associated with different car dealerships for the user to choose the most convenient or preferred car dealership for taking a test drive.

The hyperlink may also be based on a highest value bid from an advertiser or merchant within a period of time. The bid component 128 may receive a bid for an item in media content to be associated with a hyperlink from a bidder, determine whether the bid is a highest value within a period of time, and associate the item with the hyperlink in response to a determination that the bid is a highest value within the period of time. For example, the bid component 128 receives bids from multiple local car dealers that sell the model of the car featured in the car chase scene, determines which car dealer submitted the highest bid for the current week, and associates the winning dealer's hyperlink with the image of the car in the car chase scene. Rather than responding to the selection of the image of the car by displaying hyperlinks for all of the local dealers, the mobile phone 102 displays only the hyperlink for the local dealer that won the bidding process. Metatags embedded into auxiliary media content could be subject to refreshed bidding over a period of time as customers' tastes change. After a movie is released, on a weekly, monthly, or annual basis, metatags could be placed for bidding by advertisers and new hyperlinks could be associated with the metatags for newly popular products. A lead actor, for example, in a movie or other production may increase or decrease in popularity. Cult phenomena and unexpected demographic changes may cause unexpected changes in popularity of products that might be displayed in media content. By permitting images associated with metatags to be periodically bid by advertisers, marketers of movies and other media content may have the opportunity to capture additional value.

Advertisers may request or order placement of metatags associated with their products and services in multimedia content. The metatags may be accessed without interrupting the presentation of the multimedia content to access information about the products and services, for example advertisements about the products and services. In an embodiment, the original producers of the multimedia content may insert, install, and/or associate the metatags with the subject products and/or services in the multimedia content, for example a metatag associated with a sports car in an action movie. Potential customers may receive transaction information for customer-selected products and services associated with presented multimedia content without interfering with the presentation of the multimedia content, such as allowing other family members to continue watching the action movie unobstructed on the television. Commercial entities may outbid competitors to have their own hyperlink associated with products and services placed in multimedia content. Therefore, embodiments of the present disclosure provide benefits to advertisers, potential customers who are presented with multimedia content, and providers of commercial products and services.

Figure 2:
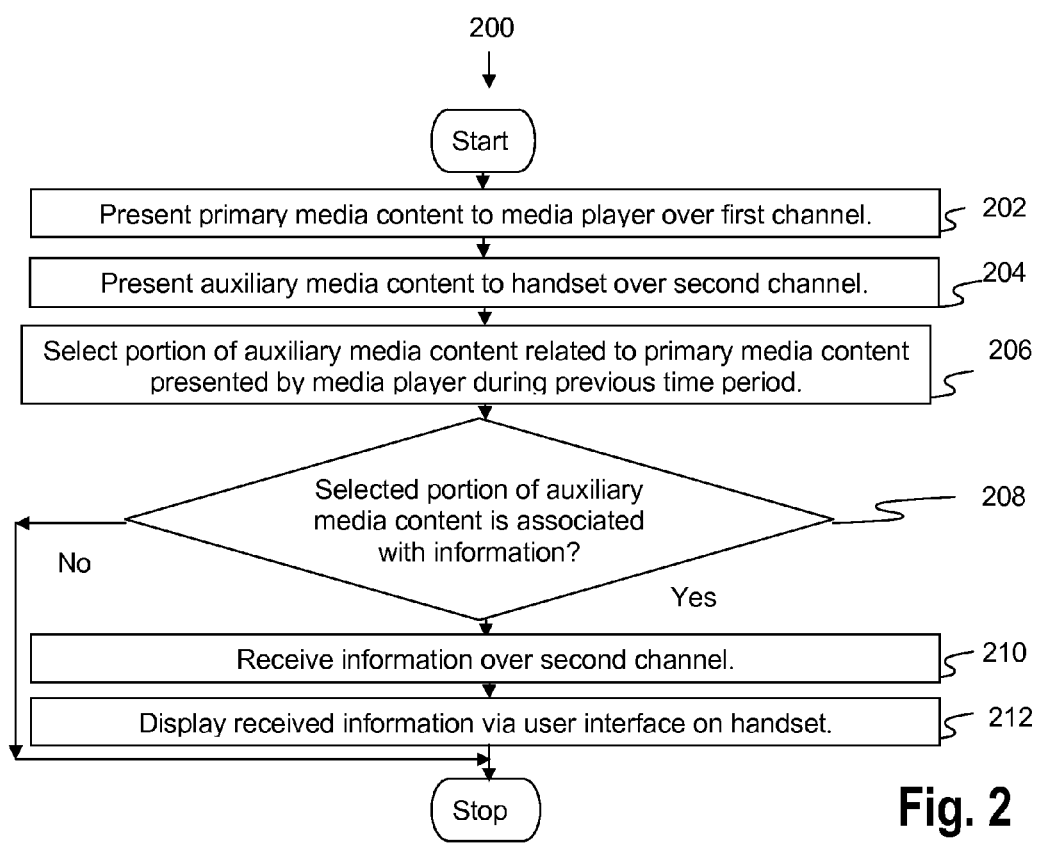
FIG. 2 is a flowchart of a method for a multimedia product placement marketplace according to some embodiments of the present disclosure.

FIG. 2 is a flowchart of a method 200 for a multimedia product placement marketplace according to some embodiments of the present disclosure. The system 100 may execute the method 200 to provide a marketplace for products and services placed in media content.

In box 202, primary media content received over a first channel is presented. For example, the television 104 presents an action movie received over a first channel.

In box 204, auxiliary media content received over a second channel is presented. For example, the mobile phone 102 presents the same action movie received over a second channel.

In box 206, a portion of the auxiliary media content related to a primary media content presented by a media player during a previous time period is selected. For example, the user of the mobile phone 102 replays the car chase scene to select the image of the car after the television finished playing the car chase scene.

In box 208, a determination is made whether a selected portion of auxiliary media content is associated with information. For example, the media component 126 determines whether the selected image of the car in the car chase scene is associated with a metatag. If the selected portion of the auxiliary media content is not associated with information, the method 200 terminates. Alternatively, in some embodiments, data about the requested information may be collected, stored, analyzed, and/or acted upon before the method 200 terminates. If the selected portion of the auxiliary media content is associated with information, the method 200 continues to box 210.

In box 210, information is received over a second channel. For example, the media component 126 receives hyperlinks for local car dealers that sell the model of car. While the term hyperlink may be associated with accessing a site available on the world wide web of the Internet, the term herein is more broadly defined to indicate a linkage or access to a remote information source found in a plurality of locations of information.

In box 212, received information is displayed via a user interface on a handset, wherein the received information includes a hyperlink to a commerce server that provides a commercially available product and/or a commercially available service related to a selected portion of auxiliary media content to enable a transaction. For example, the media component 126 displays the hyperlinks to the local car dealers via the user interface 118 to enable a transaction.

Figure 3:
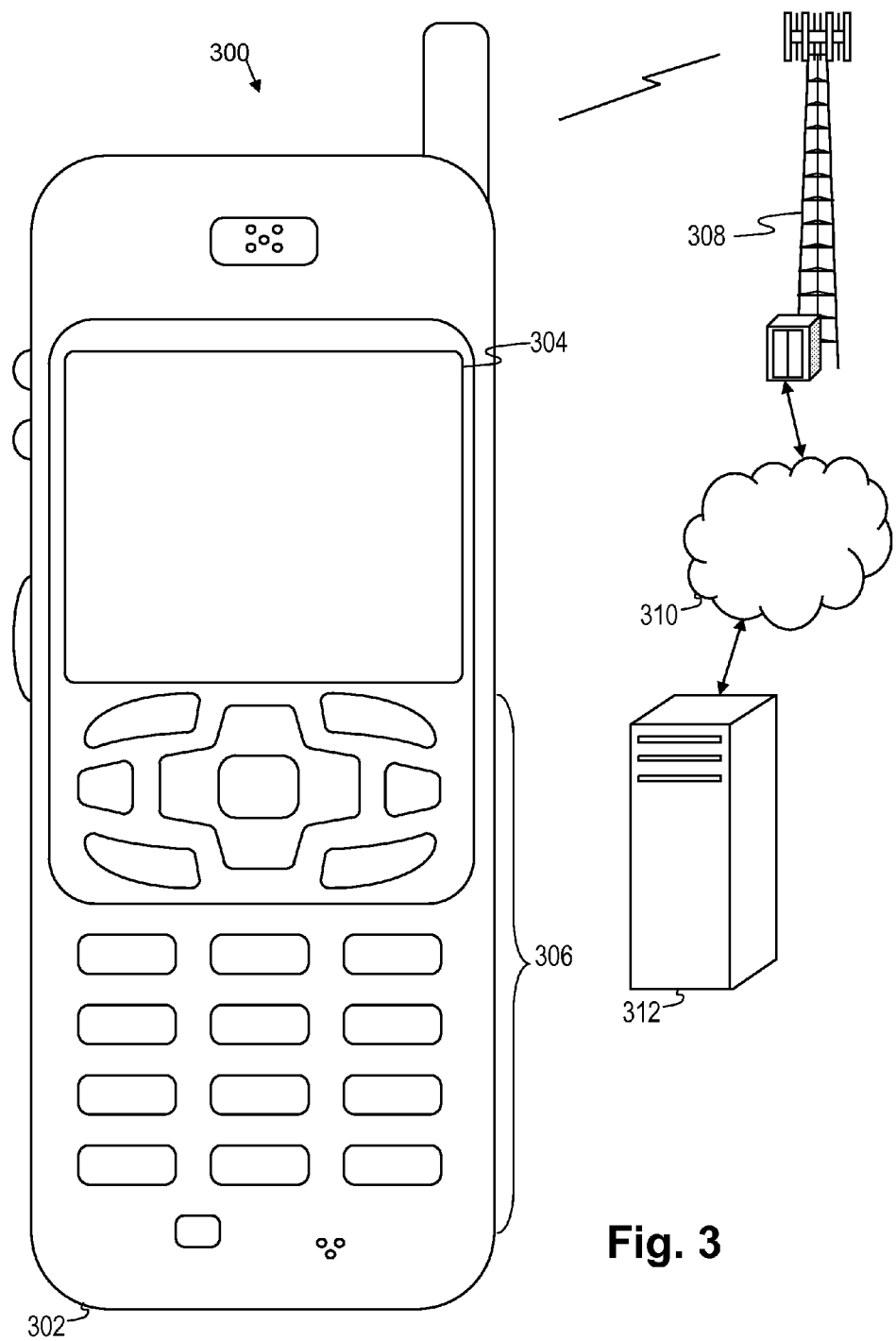
FIG. 3 shows an illustrative wireless communications system according to some embodiments of the present disclosure.

FIG. 3 shows a wireless communications system 300 including the mobile device 302. In some embodiments, the handset 102 may be implemented as the handset 302. FIG. 3 depicts the handset 302, which is operable for implementing aspects of the present disclosure, but the present disclosure should not be limited to these implementations. Though illustrated as a mobile phone, the handset 302 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the handset 302 is not a general purpose computing device like a portable, laptop or tablet computer, but rather is a special-purpose communications device such as a mobile phone, wireless handset, pager, or PDA. The handset 302 may support specialized activities such as gaming, inventory control, job control, and/or task management functions, and so on.

The handset 302 includes a display 304 and a touch-sensitive surface and/or keys 306 for input by a user. The handset 302 may present options for the user to select, controls for the user to actuate, and/or cursors or other indicators for the user to direct. The handset 302 may further accept data entry from the user, including numbers to dial or various parameter values for configuring the operation of the handset. The handset 302 may further execute one or more software or firmware applications in response to user commands. These applications may configure the handset 302 to perform various customized functions in response to user interaction. Additionally, the handset 302 may be programmed and/or configured over-the-air, for example from a wireless base station, a wireless access point, or a peer handset 302.

The handset 302 may execute a web browser application which enables the display 304 to show a web page. The web page may be obtained via wireless communications with a base transceiver station (BTS) 308, a wireless network access node, a peer handset 302 or any other wireless communication network or system. While a single base transceiver station 308 is illustrated, it is understood that the wireless communication system may comprise additional base transceiver stations. In some instances, the handset 302 may be in communication with multiple base transceiver stations 308 at the same time. The base transceiver station 308 (or wireless network access node) is coupled to a wired network 310, such as the Internet. Via the wireless link and the wired network, the handset 302 has access to information on various servers, such as a server 312. The server 312 may provide content that may be shown on the display 304. Alternately, the handset 302 may access the base transceiver station 308 through a peer handset 302 acting as an intermediary, in a relay type or hop type of connection.

Figure 4:
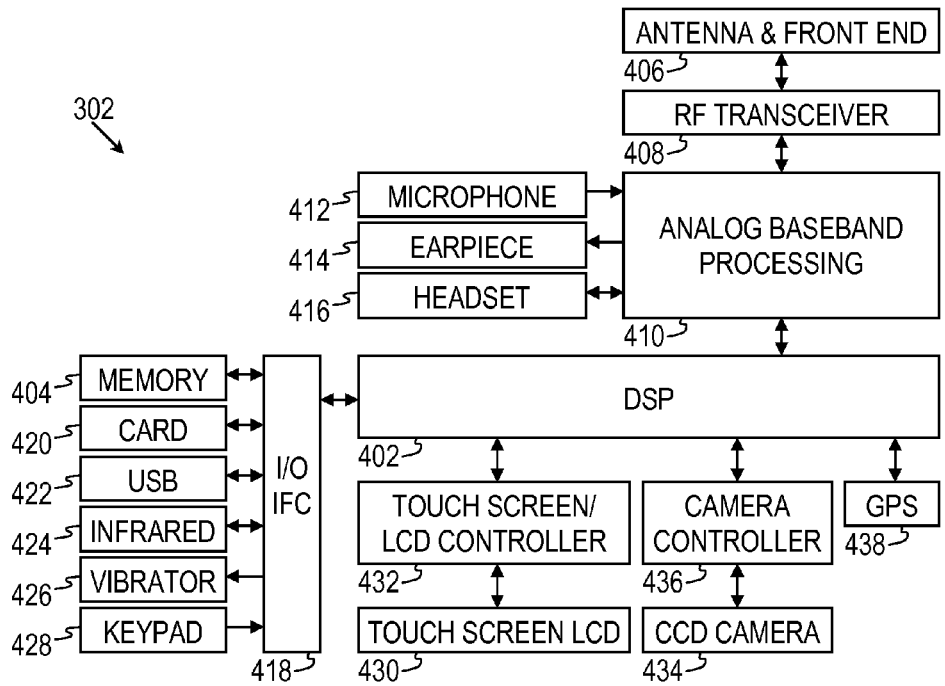
FIG. 4 is a block diagram of an illustrative handset according to some embodiments of the present disclosure.

FIG. 4 shows a block diagram of the handset 302. While a variety of known components of handsets 302 are depicted, in an embodiment a subset of the listed components and/or additional components not listed may be included in the handset 302. The handset 302 includes a digital signal processor (DSP) 402 and a memory 404. As shown, the handset 302 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the handset 302 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the handset 302 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the handset 302 to send and receive information from a radio access network (RAN) or some other available wireless communications network or from a peer handset 302. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset port 416 and outputs to the earpiece speaker 414 and the headset port 416. To that end, the analog baseband processing unit 410 may have ports for connecting to the built-in microphone 412 and the earpiece speaker 414 that enable the handset 302 to be used as a mobile phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the handset 302 to function as a peripheral device to exchange information with a personal computer or other computer system. The infrared port 424 and other optional ports such as a Bluetooth interface or an IEEE 802.11 compliant wireless interface may enable the handset 302 to communicate wirelessly with other nearby handsets and/or wireless base stations.

The input/output interface 418 may further connect the DSP 402 to the vibrator 426 that, when triggered, causes the handset 302 to vibrate. The vibrator 426 may serve as a mechanism for silently alerting the user to any of various events such as an incoming call, a new text message, and an appointment reminder.

The keypad 428 couples to the DSP 402 via the interface 418 to provide one mechanism for the user to make selections, enter information, and otherwise provide input to the handset 302. Another input mechanism may be the touch screen LCD 430, which may also display text and/or graphics to the user. The touch screen LCD controller 432 couples the DSP 402 to the touch screen LCD 430.

The CCD camera 434 enables the handset 302 to take digital pictures. The DSP 402 communicates with the CCD camera 434 via the camera controller 436. The GPS sensor 438 is coupled to the DSP 402 to decode global positioning system signals, thereby enabling the handset 302 to determine its position. In another embodiment, a camera operating according to a technology other than charge coupled device cameras may be employed. Various other peripherals may also be included to provide additional functions, e.g., radio and television reception.

Figure 5:
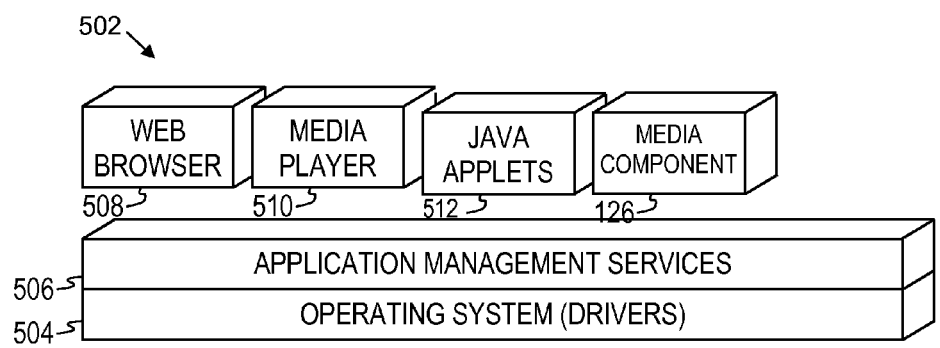
FIG. 5 is a block diagram of an illustrative software configuration for a handset according to some embodiments of the present disclosure.

FIG. 5 illustrates a software environment 502 that may be implemented by the DSP 402. The DSP 402 executes operating system drivers 504 that provide a platform from which the rest of the software operates. The operating system drivers 504 provide drivers for the handset hardware with standardized interfaces that are accessible to application software. The operating system drivers 504 include application management services ("AMS") 506 that transfer control between applications running on the handset 302. Also shown in FIG. 5 are a web browser application 508, a media player application 510, JAVA applets 512, and the media component 126. The web browser application 508 configures the handset 302 to operate as a web browser, allowing a user to enter information into forms and select links to retrieve and view web pages. The media player application 510 configures the handset 302 to retrieve and play audio or audiovisual media. The JAVA applets 512 configure the handset 302 to provide games, utilities, and other functionality.

Figure 6:
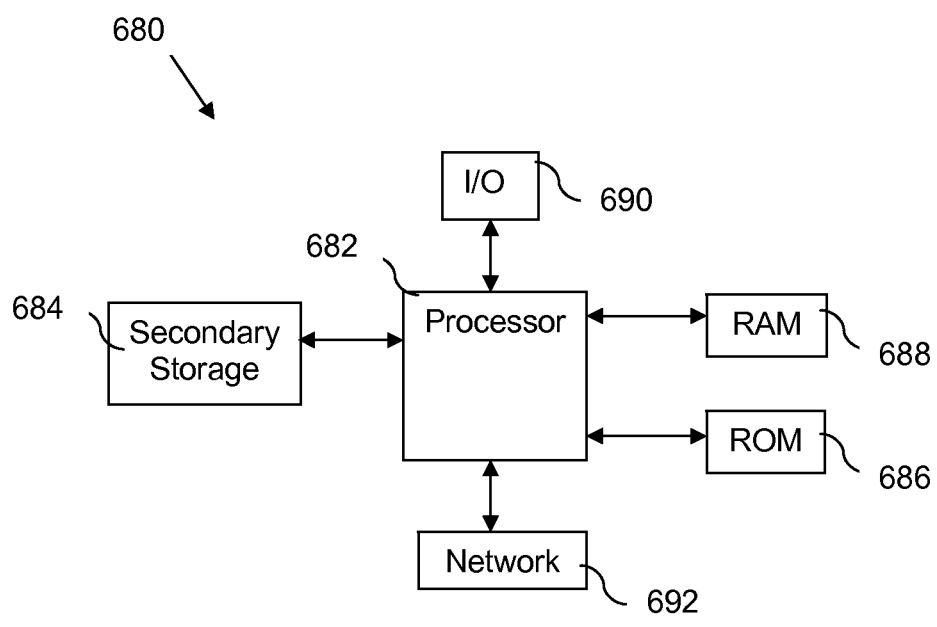
FIG. 6 shows an illustrative computer system suitable for implementing portions of the several embodiments of the present disclosure.

FIG. 6 illustrates a computer system 680 suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

In an embodiment, the computer system 680 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 680 to provide the functionality of a number of servers that is not directly bound to the number of computers in the computer system 680. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 680, at least portions of the contents of the computer program product to the secondary storage 684, to the ROM 686, to the RAM 688, and/or to other non-volatile memory and volatile memory of the computer system 680. The processor 682 may process the executable instructions and/or data in part by directly accessing the computer program product, for example by reading from a CD-ROM disk inserted into a disk drive peripheral of the computer system 680. The computer program product may comprise instructions that promote the loading and/or copying of data, data structures, files, and/or executable instructions to the secondary storage 684, to the ROM 686, to the RAM 688, and/or to other non-volatile memory and volatile memory of the computer system 680.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for a multimedia product placement marketplace, comprising:
   a processor on a handset;
   a memory on the handset; and
   a media component stored in the memory, that when executed by the processor,
      selects, based on user input, a user-selected portion of an auxiliary media content related to a primary media content received by a different media player over a first channel, wherein the auxiliary media content comprises at least some of the primary media content presented by the different media player,
      determines that the user-selected portion of the auxiliary media content is associated with a metatag of the auxiliary media content,
      receives at least one item of information associated with the metatag over a second channel in response to a determination that the user-selected portion of the auxiliary media content is associated with the metatag,
      displays the received information via a user interface on the handset, wherein the received at least one item of information comprises a link to a commerce server that provides at least one of a commercially available product and a commercially available service related to the user-selected portion of the auxiliary media content to enable a transaction,
      selects, based on user input, a second user-selected portion of the auxiliary media content related to the primary media content received by the different media player,
      determines that the second user-selected portion of the auxiliary media content is not associated with a second metatag of the auxiliary media content,
      responsive to a determination that the second user-selected portion of the auxiliary media content is not associated with the second metatag of the auxiliary media content, requests, from a commerce server, at least one item of information associated with the second user-selected portion of the auxiliary media content, and receives the at least one item of information associated with the second user-selected portion of the auxiliary media content in response to the requesting.

2. The system of claim 1, wherein the handset is one of a mobile phone, a wireless communication device, a pager, a personal digital assistant, a portable computer, a tablet computer, a laptop computer, a digital camera, a digital music player, a digital calculator, an electronic key fob for keyless entry, a second media player, and an inventory control device.

3. The system of claim 1, wherein the different media player comprises one of a television, a set top box, a gaming console, a satellite radio device, a motion picture theater, a desktop computer, a personal computer, a laptop computer, a tablet computer, a portable telecommunications device, a cellular telephone, a digital telephone, and a personal digital assistant.

4. The system of claim 1, wherein the media component receives the auxiliary media content from the different media player over the second channel using a short range wireless connection.

5. The system of claim 4, wherein the short range wireless connection uses at least one of a Bluetooth technology, a near field communication (NFC) technology, a wireless fidelity (Wi-Fi) technology, and infrared technology, and a radio frequency identification (RFID) technology.

6. The system of claim 1, further comprising a content provider that transmits the primary media content to the different media player and inserts the metatag into the auxiliary media content to associate the user-selected portion of the auxiliary media content with the at least one item of information.

7. The system of claim 6, wherein the different media player receives the primary media content from the content provider over the first channel using a long range fixed connection.

8. The system of claim 6, wherein the media component receives the auxiliary media content from the content provider using a long range wireless connection.

9. The system of claim 1, wherein the handset wirelessly communicates via one of a code division multiple access (CDMA) technology, a global system for mobile communication (GSM) technology, a universal mobile telecommunications system (UMTS) technology, a long-term evolution (LTE) technology, and a worldwide interoperability for microwave access (WiMAX) technology.

10. The system of claim 1, wherein the media component further requests the at least one item of information associated with the user-selected portion of the auxiliary media content in response to a determination that the selected portion of the auxiliary media content is not associated with the metatag, receives the at least one item of information over the second channel in response to requesting the at least one item of information, and displays the at least one item of information via the user interface on the handset.

11. The system of claim 1, wherein the media component further synchronizes presentation of the auxiliary media content with presentation of the primary media content received by the different media player.

12. The system of claim 11, wherein the synchronization is based on user input entered via the user interface.

13. A system for a multimedia product placement marketplace, comprising:

a first processor on a server;

a first memory on the server;

a bid component stored in the first memory, that when executed by the first processor, receives a bid to associate a content link to a media content, determines whether the bid is a highest value within a period of time, and associates the media content to the content link in response to a determination that the bid is a highest value within the period of time;

a second processor on a handset;

a second memory on the handset; and a media component stored in the second memory, that when executed by the second processor, selects, based on user input, a user-selected portion of an auxiliary media content related to a primary media content received by a different media player over a first channel wherein the auxiliary media content comprises at least some of the primary media content presented by the different media player, determines whether the user-selected portion of the auxiliary media content comprises a metatag of the auxiliary media content, receives the content link over a second channel in response to a determination that the user-selected portion of the auxiliary media content comprises the metatag, displays the received content link via a user interface on the handset, wherein the received content link comprises a link to a commerce server that provides at least one of a commercially available product and a commercially available service related to the user-selected portion of the auxiliary media content to enable a transaction, selects, based on user input, a second user-selected portion of the auxiliary media content related to the primary media content received by the different media player, determines that the second user-selected portion of the auxiliary media content is not associated with a second metatag of the auxiliary media content, responsive to a determination that the second user-selected portion of the auxiliary media content is not associated with the second metatag of the auxiliary media content, requests, from a commerce server, at least one item of information associated with the second user-selected portion of the auxiliary media content, and receives the at least one item of information associated with the second user-selected portion of the auxiliary media content in response to the requesting.

14. The system of claim 13, wherein the bid is based on a geographic location associated with the handset executing a location fix technology.

15. The system of claim 14, wherein the location fix technology comprises one of advanced forward link trilateration, global positioning system, a cell sector location fix technology, and a hybrid location fix technology.

16. The system of claim 13, wherein the auxiliary media content is related to the primary media content and comprises the at least some of the primary media content presented by the different media player during a time period.

17. The system of claim 16, wherein the different media player and the handset are different types of devices.

18. The system of 17, wherein the user-selected portion of the auxiliary media content is a portion of the primary media content presented by the different media player during the time period.

19. The system of claim 13, wherein responsive to a determination that the selected portion of the auxiliary media content is not associated with the metatag of the auxiliary media content, the media component requests the at least one item of information associated with the user-selected portion of the auxiliary media content from a commerce server and receives the at least one item of information associated with the selected portion of the auxiliary media content in response to requesting the at least one item of information.

\* \* \* \* \*